US011706775B2

(12) United States Patent
Zhao et al.

(10) Patent No.: US 11,706,775 B2
(45) Date of Patent: Jul. 18, 2023

(54) WIRELESS COMMUNICATION METHOD AND DEVICE

(71) Applicant: GUANGDONG OPPO MOBILE TELECOMMUNICATIONS CORP., LTD., Dongguan (CN)

(72) Inventors: Zhenshan Zhao, Dongguan (CN); Huei-Ming Lin, South Yarra (AU); Qianxi Lu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 17/238,197

(22) Filed: Apr. 22, 2021

(65) Prior Publication Data

US 2021/0243739 A1 Aug. 5, 2021

Related U.S. Application Data

(63) Continuation of application No. PCT/CN2019/080241, filed on Mar. 28, 2019.

(30) Foreign Application Priority Data

Nov. 1, 2018 (WO) ................ PCT/CN2018/113528

(51) Int. Cl.
*H04W 72/23* (2023.01)
*H04W 4/46* (2018.01)
*H04W 4/40* (2018.01)

(52) U.S. Cl.
CPC ............. *H04W 72/23* (2023.01); *H04W 4/40* (2018.02); *H04W 4/46* (2018.02)

(58) Field of Classification Search
CPC ......... H04W 4/40; H04W 92/18; H04W 4/46; H04W 4/26
See application file for complete search history.

(56) References Cited

U.S. PATENT DOCUMENTS

2017/0048647 A1  2/2017  Jung et al.
2018/0049235 A1* 2/2018  Baghel ................. H04W 76/14
(Continued)

FOREIGN PATENT DOCUMENTS

CN    105992364 A    10/2016
CN    106465369 A     2/2017
(Continued)

OTHER PUBLICATIONS

WO, International Search Report, PCT/CN2018/113528 dated Jul. 26, 2019, 28 pages.
(Continued)

*Primary Examiner* — Khaled M Kassim
*Assistant Examiner* — Najeeb Ansari
(74) *Attorney, Agent, or Firm* — Bayes PLLC

(57) ABSTRACT

The embodiments of the present disclosure provide a wireless communication method and device, which can implement normal operation of a terminal device having multiple capabilities. The method includes reporting, by a first terminal device, capability information of the first terminal device and capability information of a third terminal device to a network device; acquiring, by the first terminal device, a first transmission resource set configured by the network device for performing sidelink communication; and performing, by the first terminal device, the sidelink communication with the third terminal device using a resource in the first transmission resource set.

18 Claims, 5 Drawing Sheets

(56) References Cited

U.S. PATENT DOCUMENTS

| | | | |
|---|---|---|---|
| 2018/0092067 A1 | 3/2018 | Liu et al. | |
| 2018/0139778 A1 | 5/2018 | Chou | |
| 2018/0176937 A1 | 6/2018 | Chen et al. | |
| 2019/0229964 A1* | 7/2019 | Ouchi | H04L 27/2613 |
| 2019/0239118 A1* | 8/2019 | Baghel | H04L 5/0053 |
| 2019/0306835 A1* | 10/2019 | Hoang | H04W 72/082 |
| 2020/0229188 A1* | 7/2020 | Tang | H04W 72/0453 |
| 2020/0304253 A1* | 9/2020 | Choi | H04L 5/0053 |
| 2021/0051630 A1* | 2/2021 | Chae | H04W 72/02 |
| 2021/0377108 A1* | 12/2021 | Cho | H04W 72/0453 |
| 2022/0061007 A1* | 2/2022 | Kim | H04L 27/2666 |

FOREIGN PATENT DOCUMENTS

| | | |
|---|---|---|
| CN | 106792430 A | 5/2017 |
| CN | 107211316 A | 9/2017 |
| CN | 107347215 A | 11/2017 |
| CN | 107710845 A | 2/2018 |
| CN | 108370565 A | 8/2018 |
| CN | 108464048 A | 8/2018 |
| CN | 108668367 A | 10/2018 |
| JP | 2017513392 A | 5/2017 |
| WO | 2017/159451 A1 | 9/2017 |
| WO | 2017166141 A1 | 10/2017 |
| WO | 2017209005 A1 | 12/2017 |
| WO | 2018/085045 A1 | 5/2018 |
| WO | 2018126872 A1 | 7/2018 |

OTHER PUBLICATIONS

PCT Written Opinion of the International Searching Authority issued in corresponding International Application No. PCT/CN2018/113528 dated Jul. 26, 2019, 9 pages.

WO, International Search Report, PCT/CN2019/080241 dated Jul. 26, 2019, 30 pages.

PCT Written Opinion of the International Searching Authority issued in corresponding International Application No. PCT/CN2019/080241 dated Jul. 26, 2019, 7 pages.

Supplementary European Search Report issued in corresponding European Application No. 19878868.9, dated Nov. 12, 2021, 8 pages.

First Office Action issued in corresponding European application No. 19878868.9, dated Jul. 29, 2022.

First Office Action issued in corresponding Chinese application No. 202110443670.0, dated Aug. 9, 2022.

Second Office Action issued in corresponding Chinese application No. 202110443670.0, dated Oct. 25, 2022.

Notice of Allowance issued in corresponding Chinese application No. 202110443670.0, dated Jan. 18, 2023.

Second Office Action issued in corresponding European application No. 19878868.9, dated Jan. 20, 2023.

First Office Action issued in corresponding Japanese application No. 2021-523630, dated Feb. 3, 2023.

First Office Action issued in corresponding Indian application No. 202117019995, dated Feb. 28, 2023.

* cited by examiner

WIRELESS COMMUNICATION METHOD AND DEVICE

CROSS-REFERENCE TO RELATED APPLICATIONS

The present application is a continuation of International Application No. PCT/CN2019/080241, filed Mar. 28, 2019, which claims the benefit of priority to International Application No. PCT/CN2018/113528, filed Nov. 1, 2018, the entire contents of which are incorporated herein by reference.

BACKGROUND

The embodiments of the present disclosure relate to the field of communication technology, and more particularly, to a wireless communication method and device.

The Vehicle to Everything (V2X) system is based on Sidelink (SL) transmission technology and adopts the way of Device to Device (D2D) direct communication. Therefore, the V2X system has a relatively high spectrum efficiency and a relatively low transmission delay.

The New Radio (NR) system can support terminal devices of multiple capabilities, and how to make the terminal devices of multiple capabilities work normally is an urgent problem to be solved.

SUMMARY

The embodiments of the present disclosure provide a wireless communication method and device, which can realize the normal operation of terminal devices of multiple capabilities.

In a first aspect, there is provided a wireless communication method, including: acquiring, by a first terminal device, according to capability information of the first terminal device, a first transmission resource set for performing sidelink communication; and performing, by the first terminal device, the sidelink communication using resources in the first transmission resource set.

In a second aspect, there is provided a wireless communication method, including: sending, by a third terminal device, capability information of the third terminal device to a first terminal device, the capability information of the third terminal device being used by the first terminal device to determine a first transmission resource set; receiving, by the third terminal device, indication information sent by the first terminal device, the indication information being used to indicate the first transmission resource set; and performing, by the third terminal device, the sidelink communication with the first terminal device using a resource in the first transmission resource set.

In a third aspect, there is provided a wireless communication method, including: acquiring capability information of a first terminal device; and sending first information to the first terminal device based on the capability information of the first terminal device, the first information indicating a first transmission resource set for the first terminal device to perform sidelink communication.

In a fourth aspect, there is provided a terminal device. The terminal device is used for executing the method in the first aspect or the second aspect described above.

Specifically, the terminal device includes a function module used for executing the method in the first aspect or the second aspect described above.

In a fifth aspect, there is provided a communication device. The communication device is used for executing the method in the third aspect described above.

Specifically, the communication device includes a function module used for executing the method in the third aspect described above.

In a sixth aspect, there is provided a terminal device, including a processor and a memory. The memory is used for storing a computer program, and the processor is used for calling and running the computer program stored in the memory, to execute the method in the first aspect or the second aspect described above.

In a seventh aspect, there is provided a communication device, including a processor and a memory. The memory is used for storing a computer program, and the processor is used for calling and running the computer program stored in the memory, to execute the method in the third aspect described above.

In an eighth aspect, there is provided a chip. The chip is used for implementing the method in the first aspect or the second aspect described above.

Specifically, the chip includes a processor used for calling and running a computer program from a memory so that a device mounted with the chip executes the method in the first aspect, the second aspect or the third aspect described above.

In a ninth aspect, there is provided a computer readable storage medium. The computer readable storage medium is used for storing a computer program, and the computer program makes a computer to execute the method in the first aspect, the second aspect or the third aspect described above.

In a tenth aspect, there is provided a computer program product. The computer program product includes a computer program instruction, and the computer program instruction makes a computer to execute the method in the first aspect, the second aspect or the third aspect described above.

In an eleventh aspect, there is provided a computer program. When the computer program is run on a computer, the computer program makes the computer to execute the method in the first aspect, the second aspect or the third aspect described above.

Therefore, in the embodiments of the present disclosure, the transmission resource set used for the first terminal device to perform sidelink communication can be acquired according to the capability information of the first terminal device, and it can be realized that the acquired transmission resource set is adapted to the capability of the terminal device, so that terminal devices of various capabilities can communicate normally.

DETAILED DESCRIPTION

Figure 1:
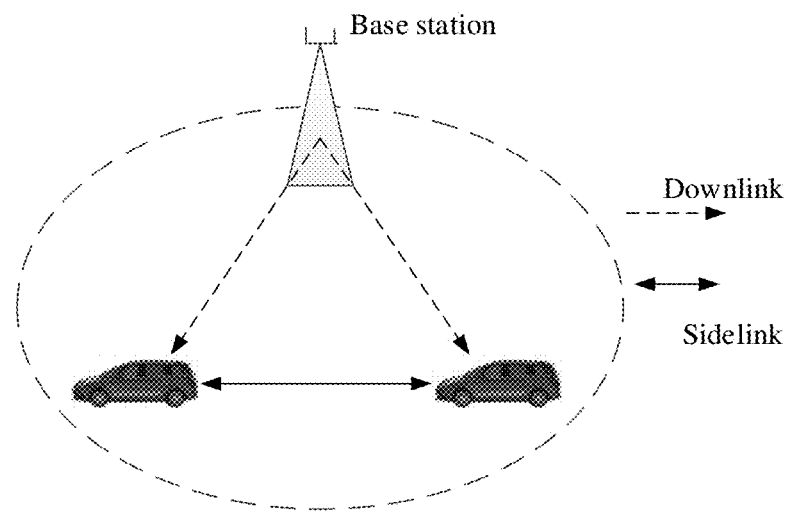
FIG. 1 is a system architecture diagram of the V2X under mode 3 and mode 4 according to an embodiment of the present disclosure.
Figure 1:
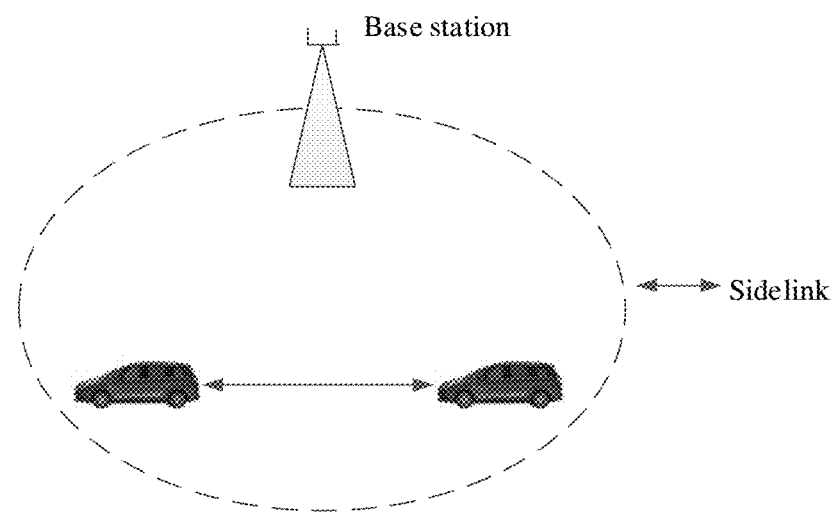

The technical solutions in the embodiments of the present disclosure are described in the following in combination with the drawings in the embodiments of the present disclosure. It is apparent that the embodiments described are only part, but not all, of the embodiments of the present disclosure. All other embodiments obtained by those skilled in the art based on the embodiments of the present disclosure without paying an inventive labor fall within the protection scope of the present disclosure.

The technical solutions in the embodiments of the present disclosure are described in the following in combination with the drawings in the embodiments of the present disclosure. It is apparent that the embodiments described below only part, but not all, of the embodiments of the present disclosure. All other embodiments obtained by those skilled in the art based on the embodiments of the present disclosure without paying an inventive labor fall within the protection scope of the present disclosure.

The technical solutions of the embodiments of the present disclosure may be applied to various communication systems, such as a Global System of Mobile communication (GSM), a Code Division Multiple Access (CDMA) system, a Wideband Code Division Multiple Access (WCDMA) system, General Packet Radio Service (GPRS), a Long Term Evolution (LTE) system, an LTE Frequency Division Duplex (FDD) system, an LTE Time Division Duplex (TDD), a Universal Mobile Telecommunication System (UMTS), a Worldwide Interoperability for Microwave Access (WiMAX) communication system, or a 5G system.

A network device mentioned in the embodiments of the present disclosure may be a device that communicates with a terminal device (or called a communication terminal or a terminal). The network device may provide communication coverage for a specific geographic area and may communicate with a terminal device located in the coverage area. Optionally, the network device may be a Base Transceiver Station (BTS) in a GSM system or CDMA system, a NodeB (NB) in a WCDMA system, an Evolutional NodeB (eNB or eNodeB) in a LTE system, or a wireless controller in a Cloud Radio Access Network (CRAN); or, the network device may be a mobile switching center, a relay station, an access point, a vehicle-mounted device, a wearable device, a hub, a switch, a bridge, a router and a network side device in 5G networks or a network device in a future evolved Public Land Mobile Network (PLMN), etc.

A terminal device mentioned in the embodiments of the present disclosure includes, but is not limited to: a connection via wired lines, such as via a Public Switched Telephone Network (PSTN), a Digital Subscriber Line (DSL), a digital cable, and a direct cable connection; and/or another data connection/network; and/or via a wireless interface, such as for a cellular network, a Wireless Local Area Network (WLAN), a digital TV network such as DVB-H networks, a satellite network, an AM-FM broadcast transmitter; and/or an apparatus of another terminal device that is set to receive/send a communication signal; and/or an Internet of Things (IoT) device. The terminal device set to communicate through a wireless interface may be referred to as a "wireless communication terminal", a "wireless terminal" or a "mobile terminal". Examples of the mobile terminal include, but are not limited to: a satellite or cellular phone; a Personal Communications System (PCS) terminal that can combine a cellular radio phone with data processing, fax, and data communication capabilities; the mobile terminals may include a radio phone, a pager, Internet/Intranet access, a Web browser, a memo pad, a calendar, and/or a PDA of a Global Positioning System (GPS) receiver; and a conventional laptop and/or palmtop receivers or other electronic apparatuses including a radio telephone transceiver. The terminal device may refer to an access terminal, User Equipment (UE), a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or other processing devices connected to a wireless modem, a vehicle device, a wearable device, a terminal device in the 5G network, or a terminal device in a future evolved PLMN, or the like.

In the 3rd Generation Partnership Project (3GPP) version 14 (Rel-14), two transmission modes are defined for the Vehicle to Everything (V2X) technology: mode 3 and mode 4.

As shown in FIG. 1, in mode 3, transmission resources of a vehicle terminal (vehicle-mounted terminal) are allocated by a base station, and the vehicle terminal sends data on the sidelink according to the resources allocated by the base station; and the base station may allocate resources for a single transmission for the terminal, or may allocate resources for a semi-static transmission to the terminal.

As shown in FIG. 1, in mode 4, the vehicle terminal adopts a transmission method of sensing plus reservation. The vehicle terminal acquires an available transmission resource set from a resource pool by means of sensing, and the terminal randomly selects one resource from the set for data transmission. Since the services in the Vehicle to Everything system have the characteristic of periodicity, the terminal usually adopts a semi-static transmission manner, that is, after the terminal selects one transmission resource, the terminal will continue to use the resource in multiple transmission periods, thereby reducing a probability of resource reselection and resource conflict. The terminal may carry information of reserving a resource for the next transmission in control information of this transmission, so that other terminals may determine whether this resource is reserved and used by the user through detecting the control information of the user, thus achieving the purpose of reducing resource conflicts.

In NR-V2X, it is necessary to support automatic driving, so higher requirements are put forward for data interaction between vehicles, such as a higher throughput, a lower delay, a higher reliability, a larger coverage, and a more flexible resource allocation, etc. The NR-V2X system may work in a large bandwidth scenario, for example, the bandwidth of a carrier is 400 MHz. However, it is difficult for terminals to support large bandwidth sending and reception due to cost or power limitations. Therefore, how to configure the transmission resource set so that terminals of different capabilities can work properly is a problem that needs to be solved. To this end, the embodiments of the present disclosure provide the following solutions to solve the problem.

It should be understood that the solution of the embodiment of the present disclosure may be applicable to the Vehicle to Everything system, and may also be applicable to other device to device (D2D) systems, which is not limited in the present disclosure.

Figure 2:
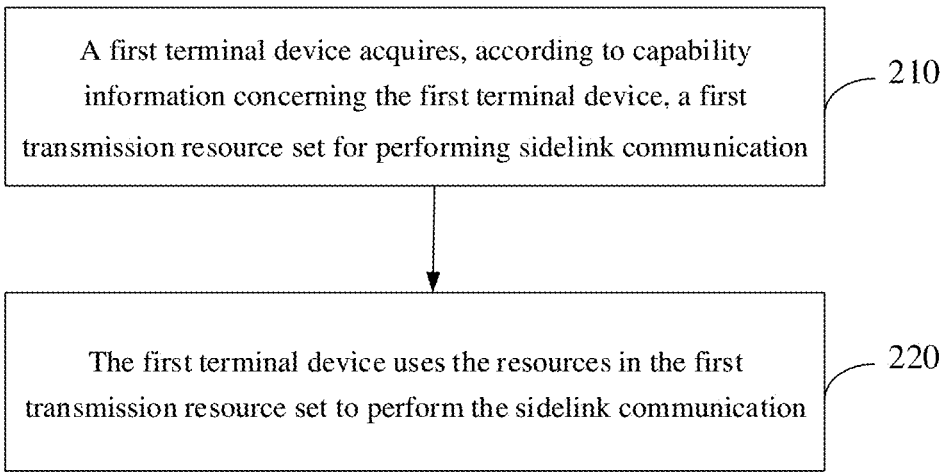
FIG. 2 is a schematic flowchart of a wireless communication method according to an embodiment of the present disclosure.

FIG. 2 is a schematic block diagram of a wireless communication method 200 according to an embodiment of the present disclosure. The method 200 may include at least part of the following content.

In step 210, a first terminal device acquires a first transmission resource set for sidelink communication according to capability information of the first terminal device.

Optionally, the transmission resource set mentioned in the embodiment of the present disclosure may be a Band Width Part (BWP), a resource pool, or a collection of transmission resources. The resource pool may include at least one resource, and during each transmission, one resource may be selected from the resource pool for communication. Dimensions of the resources in the resource pool include at least one of time domain, frequency domain, and code domain.

Optionally, the capability information of the first terminal device may represent the capability of the first terminal device in communicating with other device(s).

Specifically, the capability information in the embodiment of the present disclosure may represent a bandwidth range supported by the first terminal device, and the bandwidth range may be the bandwidth range supported by the first terminal device when performing sidelink communication. The bandwidth range may have a maximum value (that is, the capability information represents a maximum bandwidth supported by the terminal device), or may have a non-zero minimum value (that is, the capability information represents a minimum bandwidth supported by the terminal device), or may have both the maximum value and the non-zero minimum value.

In the embodiment of the present disclosure, the capability information may also represent time domain resources supported by the first terminal device.

Optionally, the capability information mentioned in the embodiment of the present disclosure may include capability levels, and each capability level may correspond to one index. The capability level of the terminal device may be preset on the terminal device.

For example, as shown in Table 1 below, there are 4 capability levels, each capability level corresponds to one supported maximum bandwidth, and each capability level has an index.

TABLE 1

| Index of capability level | Maximum bandwidth supported |
| --- | --- |
| 0 | 400 MHz |
| 1 | 100 MHz |
| 2 | 20 MHz |
| 3 | 10 MHz |

The capability information acquired by the first terminal device mentioned in the embodiment of the present disclosure may also be a specific bandwidth range instead of an index of capability level.

Optionally, in the embodiment of the present disclosure, the first transmission resource set acquired by the first terminal device according to the capability information is located within the bandwidth range supported by the first terminal device.

For example, assuming that the first transmission resource set is a BWP, the bandwidth of the BWP is less than or equal to the maximum bandwidth supported by the terminal device. For example, if the maximum bandwidth supported by the terminal device is 100M, then the bandwidth of the BWP is less than or equal to 100M.

For another example, assuming that the first transmission resource set is a resource pool, then the difference between the highest frequency and the lowest frequency occupied by all resources in the resource pool is less than or equal to the maximum bandwidth supported by the terminal device. For example, if the maximum bandwidth supported by the terminal device is 100M, the difference between the highest frequency and the lowest frequency occupied by all resources in the resource pool is less than or equal to 100M.

In order to understand the embodiments of the present disclosure more clearly, the following will introduce how the first terminal device acquires the first transmission resource set according to the capability information of the first terminal device.

In one implementation, the first terminal device sends its capability information to a second terminal device or a network device; and the first terminal device receives first information sent by the second terminal device or the network device based on the capability information, the first information indicating a first transmission resource set.

Specifically, the first terminal device may send its index of capability level to the second terminal device or the network device (or the first terminal device may directly send the bandwidth range supported by the first terminal device to the second terminal device or the network device). After acquiring the index of capability level, the terminal device or the network device may select the first transmission resource set from a plurality of transmission resource sets, and send the first information to the first terminal device, where the first information may indicate the first transmission resource set.

The first information may include an index of the first transmission resource set, and the first terminal device may determine the first transmission resource set from preset transmission resource set(s) according to the index of the first transmission resource set. Alternatively, the first information may also directly include resource information of the first transmission resource set, for example, the bandwidth range, the highest frequency and/or the lowest frequency occupied by the BWP, or time domain information and/or frequency domain information of each resource in the resource pool.

Optionally, the first terminal device sends the capability information to the second terminal device using a first sidelink channel. The first sidelink channel may be a physical sidelink control channel (PSCCH) or a physical sidelink shared channel (PSSCH).

The first information may be sent by the second terminal device to the first terminal device through a second sidelink channel. The second sidelink channel may be a physical sidelink control channel or a physical sidelink shared channel.

Optionally, the first terminal device sends capability information to the network device using Radio Resource Control (RRC) signaling, Uplink Control Information (UCI), a Scheduling Request (SR), or a Buffer State Report (BSR).

The first information may be sent by the network device to the first terminal device through the RRC signaling or a downlink control channel.

In another implementation, the first terminal device selects the first transmission resource set from a plurality of transmission resource sets according to its capability information.

Specifically, the terminal device may be preset with a plurality of transmission resource sets, and the terminal device may select the first transmission resource set from the plurality of transmission resource sets according to the capability information. Alternatively, the terminal device may receive first configuration information sent by the network, the first configuration information being used to indicate the plurality of transmission resource sets, and the terminal device may select the first transmission resource set from the plurality of transmission resource sets according to the capability information. Alternatively, the terminal device acquires second configuration information, the second configuration information being used to indicate the mapping relationship between the capability levels and the plurality of transmission resource sets, and the terminal device determines the plurality of transmission resource sets according to the capability information, and then selects one transmission resource set from the plurality of transmission resource sets as the first transmission resource set.

Optionally, in the embodiment of the disclosure, the terminal device may not preset with the plurality of transmission resource sets, but preset with the index of the transmission resource set. The first terminal device may determine the index of the transmission resource set based on the capability information, and send the index of the first transmission resource set to other terminal device(s), so that other device(s) configure the transmission resource set to the terminal device.

The first transmission resource set mentioned above in the embodiment of the present disclosure is selected from the plurality of transmission resource sets (which may be selected by the first terminal device, or may be selected by the second terminal device or the network device), where the plurality of transmission resource sets correspond to a plurality of capability levels.

Specifically, the plurality of transmission resource sets may correspond one-to-one to the plurality of capability levels, or one capability level corresponds to at least two transmission resource sets, or at least two capability levels correspond to one transmission resource set. Further, if one capability level corresponds to at least two transmission resource sets, the manner in which the first transmission resource set is determined from the at least two transmission resource sets is not limited in the embodiment of the present disclosure. For example, one transmission resource set may be randomly selected as the first transmission resource set, or the first transmission resource set may be selected according to a bandwidth size supported by each transmission resource set.

Optionally, in the embodiment of the disclosure, the transmission resource set corresponding to a lower capability level is a subset of the transmission resource set corresponding to a higher capability level.

To ensure that the terminal device with the higher capability level can receive data sent by the terminal device with the lower capability level, the transmission resource set corresponding to the lower capability level may be a subset of the transmission resource set corresponding to the higher capability level.

Figure 3:
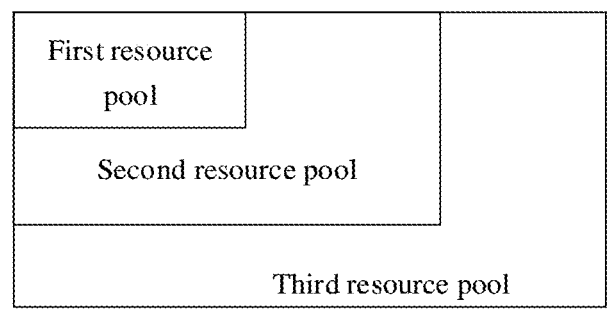
FIG. 3 is a schematic diagram of a resource pool according to an embodiment of the present disclosure.

For example, as shown in FIG. 3, there are three resource pools, namely a first resource pool, a second resource pool, and a third resource pool. The first resource pool supports terminal device(s) with a first capability level; the second resource pool supports terminal device(s) with a second capability level, where the first capability level is lower than the second capability level (the lower the capability level index is, the higher the capability level is, for example, a capability level index 0 supports 400M, and a capability level index 1 supports 100M, therefore, the capability level corresponding to the capability level index 0 is higher than the capability level corresponding to the capability level index 1), then the second resource pool includes the first resource pool, that is, the first resource pool is a subset of the second resource pool. Similarly, the third resource pool may include the second resource pool. Therefore, it is ensured that a terminal with a higher capability level can receive data sent by a terminal with a lower capability level.

It is described above that the first terminal device may acquire the first transmission resource set according to the capability information of the first terminal device. In the embodiment of the present disclosure, the first terminal device may determine the first transmission resource set based on the capability information of the first terminal device in combination with the capability information of a third terminal device.

The third terminal device mentioned herein may be a terminal device that the first terminal device performs sidelink communication with using the resource in the first transmission resource set.

Specifically, the third terminal device may be used as a receiving end for the sidelink communication using the resource in the first transmission resource set, or may also be used as a sending end for the sidelink communication using the resource in the first transmission resource set. Alternatively, the third terminal device may also be used as both the sending end and the receiving end for the sidelink communication using the resource in the first transmission resource set.

The following will specifically introduce how the first terminal device uses the capability information of the first terminal device and the capability information of the third terminal device to determine the first transmission resource set.

Specifically, the first terminal device may acquire a second transmission resource set according to the capability information of the first terminal device. The first terminal device may acquire a third transmission resource set according to the capability information of the third terminal device. Based on the second transmission resource set and the third transmission resource set, the first terminal device acquires the first transmission resource set.

The first transmission resource set may belong to an intersection of the second transmission resource set and the third transmission resource set.

Specifically, the first transmission resource set may be the intersection of the second transmission resource set and the third transmission resource set, or the first transmission resource set may be a subset of the intersection.

The second transmission resource set and the third transmission resource set in the embodiment of the present disclosure may be the same resource set, or one of them may be a subset of the other transmission resource set, for example, the second transmission resource set may be a subset of the third transmission resource set, or the third transmission resource set may be a subset of the second transmission resource set.

Therefore, since the second transmission resource set and the third transmission resource set are acquired based on the capability information of the first terminal device and the capability information of the third terminal device, respectively, that is, they are the transmission resource sets supported by the first terminal device and the third terminal device, respectively, and the first transmission resource set is the intersection of the second transmission resource set and the third transmission resource set, the resources in the first transmission resource set are all resources supported by the first terminal device and the third terminal device, and thus communication that meets the capabilities of the first terminal device and the third terminal device can be realized.

Optionally, in the embodiment of the present disclosure, according to the capability information of the first terminal device, the first terminal device selects transmission resources from a fourth transmission resource set as the second transmission resource set.

The fourth transmission resource set is preset on the first terminal device, or is configured by a network device, or may be configured by a group head of a terminal device group to which the first terminal device belongs.

Optionally, in the embodiment of the present disclosure, according to the capability information of the third terminal device, the first terminal device selects transmission resources from a fifth transmission resource set as the third transmission resource set.

The fifth transmission resource set is preset on the first terminal device, or is configured by the network device, or may be configured by the group head of the terminal device group to which the first terminal device belongs.

The fourth transmission resource set and the fifth transmission resource set mentioned in the embodiment of the present disclosure may be the same resource set or different resource sets, and the two transmission resource sets have at least one transmission resource in common. For example, one transmission resource set is a subset of the other transmission resource set.

In the following, explanations are given by using an example in which the fourth transmission resource set and the fifth transmission resource set are the same resource set.

For example, the network device configures one transmission resource set for the first terminal device. The transmission resource set includes three resource pools, namely a resource pool 1, a resource pool 2, and a resource pool 3, corresponding to 10M bandwidth, 20M bandwidth, and 30M bandwidth, respectively. If the first terminal device supports 20M bandwidth, it can be known that the first terminal device supports the resource pools corresponding to 10M and 20M bandwidth, namely the resource pool 1 and the resource pool 2. If the third terminal supports 10M bandwidth, it can be known that the third terminal device supports the resource pool corresponding to the 10M bandwidth, that is, the resource pool 1. In this way, it may be obtained that the resource pool for sidelink communication between the first terminal device and the third terminal device is resource pool 1.

It should be understood that it is described above that the transmission resource sets may be determined separately according to the capability information of the first terminal device and the capability information of the third terminal device, and then the intersection of the separately determined transmission resource sets is determined as the first transmission resource set. However, it should be understood that the embodiments of the present disclosure are not limited thereto, and there are other implementations for the embodiments of the present disclosure.

Specifically, the first terminal device may determine capability information that supports a smaller capability from the capability information of the first terminal device and the capability information of the third terminal device, and then acquire the first transmission resource set according to the capability information that supports the smaller capability.

For example, the first terminal device may select at least one resource from one transmission resource set as the first transmission resource set according to the capability information that supports the smaller capability.

Optionally, in the embodiment of the present disclosure, the first terminal device sends indication information to the third terminal device, the indication information being used to indicate the first transmission resource set.

Specifically, after determining the first transmission resource set, the first terminal device may indicate the determined first transmission resource set to the third terminal device, so that the third terminal device may communicate with the first terminal device using transmission resources in the first transmission resource set.

Optionally, in the embodiment of the present disclosure, the first terminal device sends the capability information of the first terminal device to the third terminal device.

Specifically, the first terminal device may send the capability information of the first terminal device to the third terminal device, and then the third terminal device may combine the capability information of the first terminal device and the capability information of the third terminal device to determine the first transmission resource set, and communicate with the first terminal device based on the resource in the first transmission resource set. The manner in which the third terminal device determines the first transmission resource set can refer to the manner in which the first terminal device determines the first transmission resource set. For brevity, details are not described herein again.

Optionally, in the embodiment of the disclosure, the capability information of the first terminal device is sent to the third terminal device through a third sidelink channel.

The third sidelink channel may be PSCCH or PSSCH. Alternatively, in the embodiment of the present disclosure, the capability information of the first terminal device may also be sent to the third terminal device through forwarding by the network device.

Optionally, in the embodiment of the present disclosure, the first terminal device obtains the capability information of the third terminal device through a fourth sidelink channel.

The fourth sidelink channel may be PSCCH or PSSCH, or, in the embodiment of the present disclosure, the capability information of the third terminal device may also be sent to the first terminal device through forwarding by the network device.

The foregoing describes the implementation in which the first terminal device may determine the first transmission resource set by itself according to the capability information of the first terminal device and the capability information of the third terminal device. In the embodiment of the present disclosure, the first terminal device may also send he capability information of the first terminal device and the capability information of the third terminal device to the network device or the group head of the terminal device group to which the first terminal device belongs, and the first transmission resource set is determined by the network device or the group head of the terminal device group to which the first terminal device belongs.

Alternatively, it may be that the first terminal device sends the capability information of the first terminal device to the network device or the group head of the terminal device group to which the first terminal device belongs, and the third terminal device sends the capability information of the third terminal device to the network device or the group head of the terminal device group to which the first terminal device belongs, and then the first transmission resource set is determined by the network device or the group head of the terminal device group to which the first terminal device belongs.

Alternatively, it may be that the first terminal device sends the capability information that supports the smaller capability selected from the capability information of the first terminal device and the capability information of the third terminal device to the network device or the group head of the terminal device group to which the first terminal device belongs, and the first transmission resource set is determined by the network device or the group head of the terminal device group to which the first terminal device belongs.

After the first transmission resource set has been determined by the network device or the group head of the terminal device group to which the first terminal device belongs, the first transmission resource set may be indicated to the first terminal device and the third terminal device. Alternatively, the first transmission resource set may be indicated to one of the first terminal device and the third terminal device, and the one terminal device indicates the first transmission resource set to the other terminal device.

In step 220, the first terminal device performs the sidelink communication using a resource in the first transmission resource set.

Specifically, the first terminal device may receive or send data using the resources in the first transmission resource set through the sidelink.

Therefore, in the embodiment of the present disclosure, the transmission resource set used for performing the sidelink communication by the first terminal device may be acquired according to the capability information of the first terminal device, and the acquired transmission resource set may be adapted to the capability of the terminal device, so that terminal devices of various capabilities can communicate normally.

Figure 4:
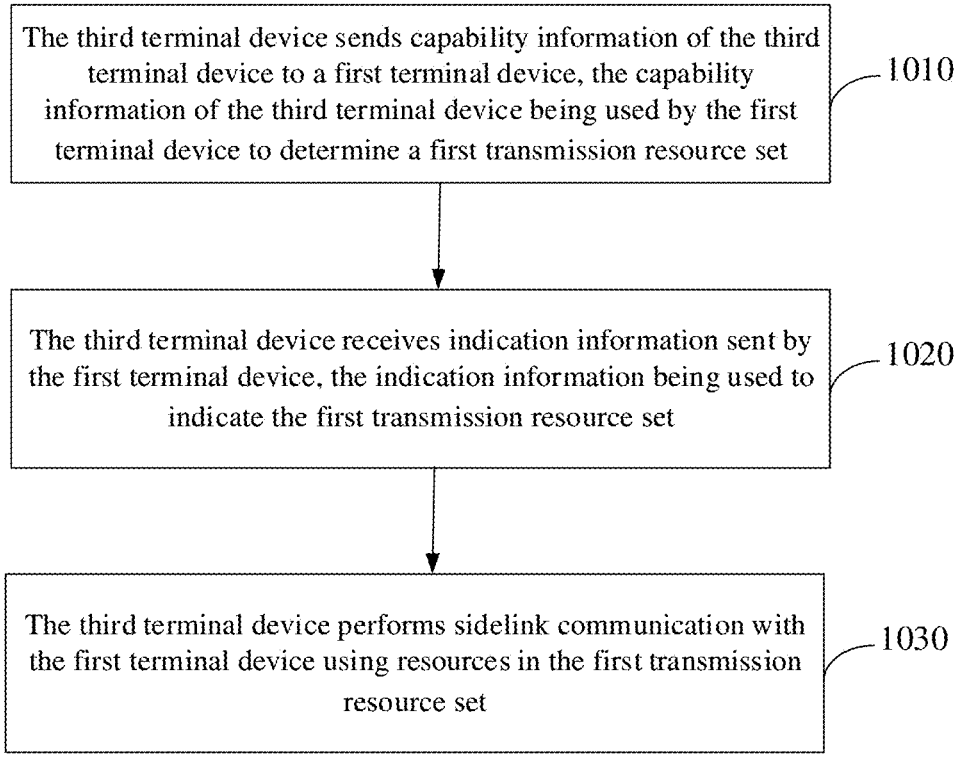
FIG. 4 is a schematic flowchart of another communication method according to an embodiment of the present disclosure.

FIG. 4 is a schematic flowchart of a wireless communication method 1000 according to an embodiment of the present disclosure. The method 1000 includes at least part of the following content.

In step 1010, a third terminal device sends the capability information of the third terminal device to a first terminal device, the capability information of the third terminal device being used by the first terminal device to determine the first transmission resource set.

In step 1020, the third terminal device receives indication information sent by the first terminal device, the indication information being used to indicate the first transmission resource set.

In step 1030, the third terminal device performs sidelink communication with the first terminal device using the resources in the first transmission resource set.

Optionally, in the embodiment of the present disclosure, the capability information of the third terminal device is sent to the first terminal device through a sidelink channel.

For a specific implementation of the method 1000, reference may be made to the description of the above method 200. For brevity, details are not described herein again.

Figure 5:
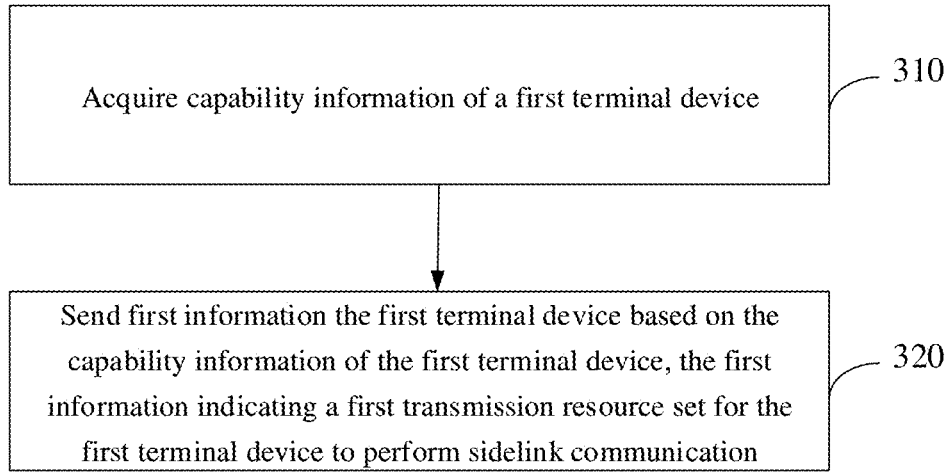
FIG. 5 is a schematic flowchart of another communication method according to an embodiment of the present disclosure.

FIG. 5 is a schematic block diagram of a wireless communication method 300 according to an embodiment of the present disclosure. The method 300 may be implemented by a second terminal device or a network device.

In step 310, capability information of a first terminal device is acquired.

In step 320, first information is sent to the first terminal device based on the capability information of the first terminal device, the first information indicating a first transmission resource set for the first terminal device to perform sidelink communication.

Optionally, in the embodiment of the present disclosure, the method 300 is performed by the second terminal device.

Optionally, in the embodiment of the present disclosure, the second terminal device acquires the capability information sent by the first terminal device through a first sidelink channel.

The first sidelink channel may be a physical sidelink control channel or a physical sidelink shared channel.

The first information may be sent by the second terminal device to the first terminal device through a second sidelink channel.

The second sidelink channel may be a physical sidelink control channel or a physical sidelink shared channel.

Optionally, in the embodiment of the present disclosure, the method 300 is performed by the network device.

Optionally, in the embodiment of the present disclosure, the network device acquires the capability information from radio resource control (RRC) signaling, uplink control information (UCI), a scheduling request (SR), or a buffer status report (BSR) sent by the first terminal device.

Optionally, in the embodiment of the present disclosure, the first information is sent by the network device to the first terminal device through the RRC signaling or a downlink control channel.

Optionally, in the embodiment of the present disclosure, the first transmission resource set may be selected from a plurality of transmission resource sets based on the capability information. The first information is sent to the first terminal device, the first information indicating the first transmission resource set.

Optionally, in the embodiment of the present disclosure, the plurality of transmission resource sets correspond to a plurality of capability levels, where the transmission resource set corresponding to a lower capability level is a subset of the transmission resource set corresponding to the high capability level.

Optionally, in the embodiment of the present disclosure, the capability information is the capability level of the first terminal device.

Optionally, in the embodiment of the present disclosure, the capability information represents a bandwidth range supported by the first terminal device.

Optionally, in the embodiment of the present disclosure, the first transmission resource set is located within the bandwidth range supported by the terminal.

Optionally, in the embodiment of the present disclosure, the first transmission resource set is a resource pool including at least one transmission resource or is a bandwidth part (BWP).

For a specific implementation of the method 300, reference may be made to the description of the method 200. For brevity, details are not described herein again.

Therefore, in the embodiment of the present disclosure, the transmission resource set used for the sidelink communication of the first terminal device can be acquired according to the capability information of the first terminal device, and the acquired transmission resource set can be adapted to the capability of the terminal device, so that terminal devices of various capabilities can communicate normally.

Figure 6:
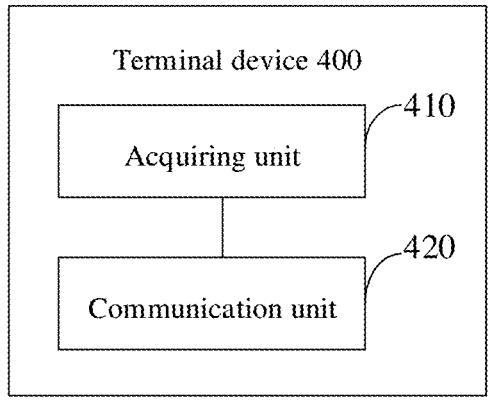
FIG. 6 is a schematic block diagram of a terminal device according to an embodiment of the present disclosure.

FIG. 6 is a schematic block diagram of a terminal device 400 according to an embodiment of the present disclosure. The terminal device 400 is a first terminal device and includes: an acquiring unit 410 configured to acquire, according to capability information of the first terminal device, a first transmission resource set for performing sidelink communication; and a communication unit 420 configured to perform sidelink communication using resources in the first transmission resource set.

Optionally, in the embodiment of the present disclosure, the acquiring unit 410 is further configured to: send the capability information to a second terminal device or a network device; receive first information sent by the second terminal device or the network device based on the capability information, the first information indicating the first transmission resource set.

Optionally, in the embodiment of the present disclosure, the acquiring unit 410 is configured to send the capability information to the second terminal device using a first sidelink channel.

Optionally, in the embodiment of the present disclosure, the first sidelink channel is a physical sidelink control channel or a physical sidelink shared channel.

Optionally, in the embodiment of the present disclosure, the first information is sent by the second terminal device to the first terminal device through a second sidelink channel.

Optionally, in the embodiment of the present disclosure, the second sidelink channel is a physical sidelink control channel or a physical sidelink shared channel.

Optionally, in the embodiment of the present disclosure, the acquiring unit 410 sends the capability information to the network device using radio resource control (RRC) signaling, uplink control information (UCI), a scheduling request (SR) or a buffer status report (BSR).

Optionally, in the embodiment of the present disclosure, the first information is sent by the network device to the first terminal device through RRC signaling or a downlink control channel.

Optionally, in the embodiment of the present disclosure, the acquiring unit 410 is further configured to: select the first transmission resource set from a plurality of transmission resource sets according to the capability information.

Optionally, in the embodiment of the present disclosure, the first transmission resource set is selected from the plurality of transmission resource sets, where the plurality of transmission resource sets correspond to a plurality of capability levels, and the transmission resource set corresponding to a lower capability level is a subset of the transmission resource set corresponding to a higher capability level.

Optionally, in the embodiment of the present disclosure, the capability information is the capability level of the first terminal device.

Optionally, in the embodiment of the present disclosure, the capability information represents a bandwidth range supported by the first terminal device.

Optionally, in the embodiment of the present disclosure, the first transmission resource set is located within the bandwidth range supported by the first terminal device.

Optionally, in the embodiment of the present disclosure, the first transmission resource set is a resource pool including at least one transmission resource or is a bandwidth part (BWP).

Optionally, in the embodiment of the present disclosure, the acquiring unit 410 is further configured to: acquire the first transmission resource set according to the capability information of the first terminal device and the capability information of a third terminal device.

The communication unit 420 is further configured to: perform the sidelink communication with the third terminal device using the resources in the first transmission resource set.

Optionally, in the embodiment of the present disclosure, the acquiring unit 410 is further configured to: acquire a second transmission resource set according to the capability information of the first terminal device; acquire a third transmission resource set according to the capability information of the third terminal device; and acquire the first transmission resource set based on the second transmission resource set and the third transmission resource set, where the first transmission resource set belongs to an intersection of the second transmission resource set and the third transmission resource set.

Optionally, in the embodiment of the present disclosure, the acquiring unit 410 is further configured to: select transmission resources from a fourth transmission resource set as the second transmission resource set according to the capability information of the first terminal device; and select transmission resources from a fifth transmission resource set as the third transmission resource set according to the capability information of the third terminal device.

Optionally, in the embodiment of the present disclosure, the fourth transmission resource set is preset on the first terminal device or is configured by the network device; or the fifth transmission resource set is preset on the first terminal device or configured by the network device.

Optionally, in the embodiment of the present disclosure, the communication unit 420 is further configured to: send indication information to the third terminal device, the indication information being used to indicate the first transmission resource set.

Optionally, in the embodiment of the present disclosure, the communication unit 420 is further configured to: send the capability information of the first terminal device to the third terminal device.

Optionally, in the embodiment of the disclosure, the capability information of the first terminal device is sent to the third terminal device through a third sidelink channel.

Optionally, in the embodiment of the present disclosure, the first terminal device acquires the capability information of the third terminal device through a fourth sidelink channel.

It should be understood that the terminal device 400 may implement corresponding operations implemented by the first terminal device in the method 200. For brevity, details are not described herein again.

Figure 7:
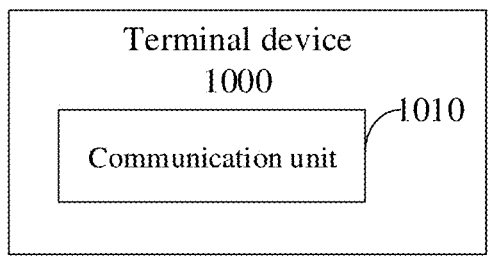
FIG. 7 is a schematic block diagram of another terminal device according to an embodiment of the present disclosure.

FIG. 7 is a schematic block diagram of a terminal device 1000 according to an embodiment of the present disclosure. The terminal device 1000 includes a communication unit 1010. The communication unit 1010 is configured to: send capability information of the terminal device to a first terminal device, the capability information of the terminal device being used by the first terminal device to determine a first transmission resource set; receive indication information sent by the first terminal device, the indication information being used to indicate the first transmission resource set; and perform the sidelink communication with the first terminal device using resources in the first transmission resource set.

Optionally, in the embodiment of the present disclosure, the capability information of the terminal device is sent to the first terminal device through a sidelink channel.

The terminal device 1000 may be used for implementing the corresponding operations implemented by the third terminal device in the above method 1000. For brevity, details are not described herein again.

Figure 8:
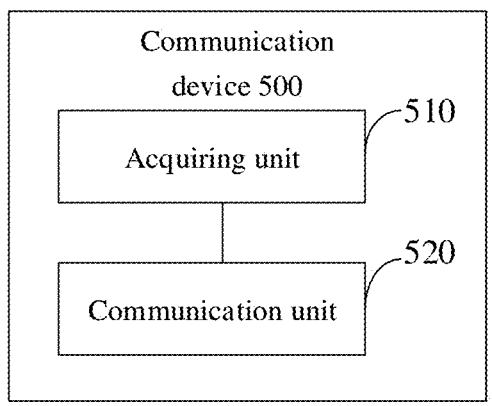
FIG. 8 is a schematic block diagram of a communication device according to an embodiment of the present disclosure.

FIG. 8 is a schematic block diagram of a communication device 500 according to an embodiment of the present disclosure. The communication device 500 includes an acquiring unit 510 configured to acquire capability information of a first terminal device; and a communication unit 520 configured to send first information to the first terminal device based on the capability information of the first terminal device, the first information indicating a first transmission resource set for the first terminal device to perform sidelink communication.

Optionally, in the embodiment of the present disclosure, the communication unit 520 is a second terminal device.

Optionally, in the embodiment of the present disclosure, the acquiring unit 510 is further configured to: acquire the capability information sent by the first terminal device through the first sidelink channel.

Optionally, in the embodiment of the present disclosure, the first sidelink channel is a physical sidelink control channel or a physical sidelink shared channel.

Optionally, in the embodiment of the present disclosure, the first information is sent by the communication unit to the first terminal device through a second sidelink channel.

Optionally, in the embodiment of the present disclosure, the second sidelink channel is a physical sidelink control channel or a physical sidelink shared channel.

Optionally, in the embodiment of the present disclosure, the communication device 500 is a network device.

Optionally, in the embodiment of the present disclosure, the acquiring unit 510 is further configured to: acquire the capability information from radio resource control (RRC) signaling, uplink control information (UCI), a scheduling request (SR) or a buffer status report (BSR) sent by the first terminal device.

Optionally, in the embodiment of the present disclosure, the first information is sent by the communication unit to the first terminal device through RRC signaling or a downlink control channel.

Optionally, in the embodiment of the present disclosure, the communication unit 510 is further configured to: select the first transmission resource set from a plurality of transmission resource sets based on the capability information; and send the first information to the first terminal device, the first information indicating the first transmission resource set.

Optionally, in the embodiment of the present disclosure, the plurality of transmission resource sets correspond to a plurality of capability levels, where the transmission resource set corresponding to a lower capability level is a subset of the transmission resource set corresponding to a higher capability level.

Optionally, in the embodiment of the present disclosure, the capability information is the capability level of the first terminal device.

Optionally, in the embodiment of the present disclosure, the capability information represents a bandwidth range supported by the first terminal device.

Optionally, in the embodiment of the present disclosure, the first transmission resource set is located within the bandwidth range supported by the first terminal device.

Optionally, in the embodiment of the present disclosure, the first transmission resource set is a resource pool including at least one transmission resource or is a bandwidth part (BWP).

It should be understood that the communication device 500 may implement corresponding operations implemented by the second terminal device or the network device in the method 300. For brevity, details are not described herein again.

Figure 9:
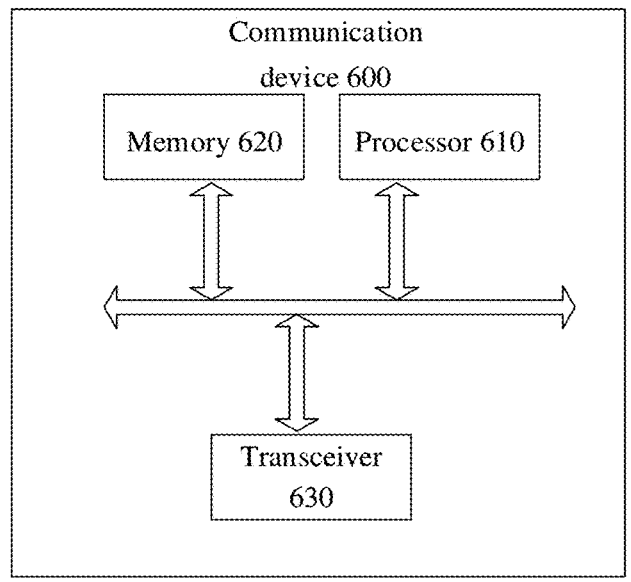
FIG. 9 is a schematic block diagram of a communication device according to an embodiment of the present disclosure.

FIG. 9 is a schematic structural diagram of a communication device 600 according to an embodiment of the present disclosure. The communication device 600 shown in FIG. 9 includes a processor 610, and the processor 610 may call and run a computer program from a memory to implement the method in the embodiment of the present disclosure.

Optionally, as shown in FIG. 7, the communication device 600 may further include a memory 620. The processor 610 may call and run the computer program from the memory 620 to implement the method in the embodiment of the present disclosure.

The memory 620 may be a separate device independent of the processor 610, or may be integrated in the processor 610.

Optionally, as shown in FIG. 9, the communication device 600 may further include a transceiver 630, and the processor 610 may control the transceiver 630 to communicate with other device(s). Specifically, it may send information or data to other device(s), or receive information or data sent by other device(s).

The transceiver 630 may include a transmitter and a receiver. The transceiver 630 may further include an antenna, and the number of the antennas may be one or more.

Optionally, the communication device 600 may specifically be the network device of the embodiment of the disclosure, and the communication device 600 may implement the corresponding process implemented by the network device in each method of the embodiment of the disclosure. For brevity, details are not repeated herein again.

Optionally, the communication device 600 may specifically be the terminal device (the first terminal device or the second terminal device) of the embodiment of the present disclosure, and the communication device 600 may implement the corresponding process implemented by the terminal device in each method of the embodiment of the present disclosure. For brevity, details are not described herein again.

Figure 10:
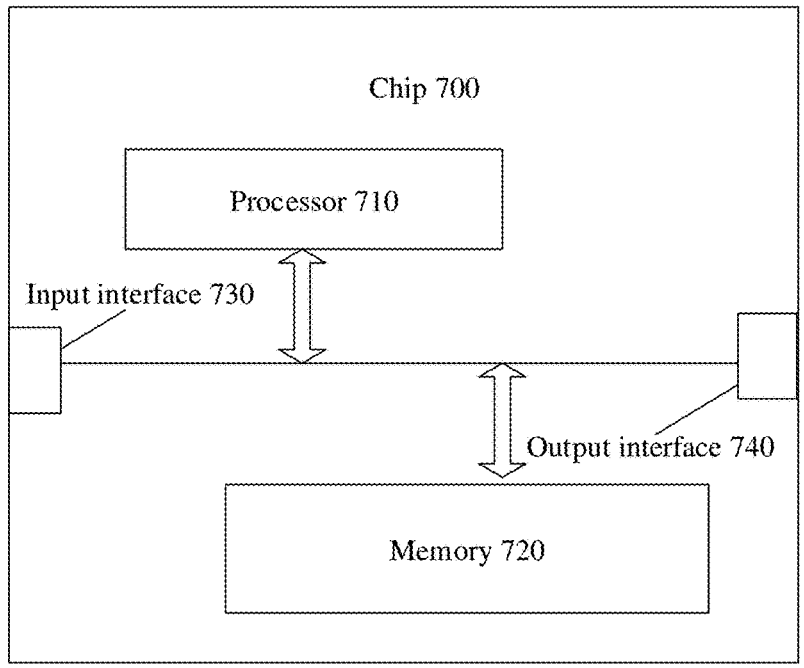
FIG. 10 is a schematic block diagram of a chip according to an embodiment of the present disclosure.

FIG. 10 is a schematic structural diagram of a chip according to an embodiment of the present disclosure. The chip 700 shown in FIG. 10 includes a processor 710, and the processor 710 may call and run a computer program from a memory to implement the method provided in the embodiment of the present disclosure.

Optionally, as shown in FIG. 8, the chip 700 may further include a memory 720. The processor 710 may call and run a computer program from the memory 720 to implement the method provided in the embodiment of the present disclosure.

The memory 720 may be a separate device independent of the processor 710, or may be integrated in the processor 710.

Optionally, the chip 700 may further include an input interface 730. The processor 710 may control the input interface 730 to communicate with other device(s) or chip(s), and specifically, may acquire information or data sent by other device(s) or chip(s).

Optionally, the chip 700 may further include an output interface 740. The processor 710 may control the output interface 740 to communicate with other device(s) or chip(s). Specifically, the output interface may output information or data to other device(s) or chip(s).

Optionally, the chip can be applied to the network device in the embodiment of the present disclosure, and the chip can implement the corresponding process implemented by the network device in each method of the embodiment of the present disclosure. For the sake of brevity, details are not described herein again.

Optionally, the chip may be applied to the terminal device (the first terminal device or the second terminal device) in the embodiment of the present disclosure, and the chip may implement the corresponding process implemented by the terminal device in each method of the embodiment of the present disclosure. For brevity, details are not described herein again.

It should be understood that the chip mentioned in the embodiment of the present disclosure may also be referred to as a system-level chip, a system chip, a chip system, or a system-on-chip chip.

Figure 11:
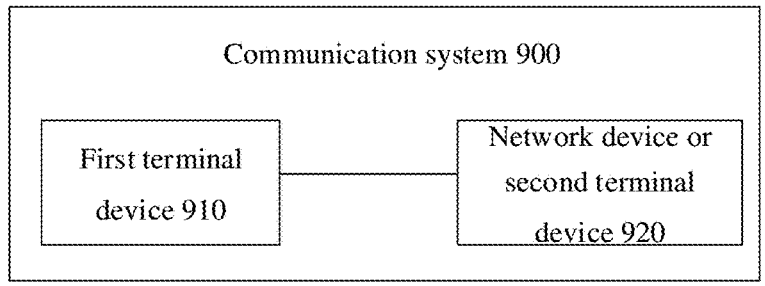
FIG. 11 is a schematic block diagram of a communication system according to an embodiment of the present disclosure.

FIG. 11 is a schematic block diagram of a communication system 900 according to an embodiment of the present disclosure. As shown in FIG. 11, the communication system 900 includes a first terminal device 910 and a network device or second terminal device 920.

The first terminal device 910 may be used for implementing the corresponding function implemented by the first terminal device in the above method, and the network device or the second terminal device 920 may be used for implementing the corresponding function implemented by the network device or the second terminal device in the above method. For brevity, details are not described herein again.

It should be understood that the processor in the embodiments of the present disclosure may be an integrated circuit chip which has signal processing capability. During implementation, each step of the foregoing method embodiments can be completed by an integrated hardware logic circuit or software instructions in the processor. The above-described processor may be a general-purpose processor, a Digital Signal Processors (DSPs), an Application Specific Integrated Circuit (ASIC), a Field Programmable Gate Array (FPGA) or other programmable logic devices, discrete gates or transistor logic devices, discrete hardware components, which can implement or perform the methods, steps, and logical block diagrams disclosed in the embodiments of the present disclosure. The general-purpose processor may be a microprocessor or any conventional processor. The steps of the methods disclosed in the embodiments of the present disclosure may be directly completed by a hardware decoding processor, or by a combination of hardware and software modules in the decoding processor. The software modules may be located in a storage medium that is well-known in the art such as a random access memory, a flash memory, a read only memory, a programmable read only memory or an electrically erasable programmable memory, a register. The storage medium is located in the memory, and the processor reads information in the memory and completes the steps of the above-described methods in combination with its hardware.

It can be understood that the memory in the embodiments of the present disclosure may be a volatile memory or a non-volatile memory, or may include both volatile memory and non-volatile memory. The non-volatile memory may be a Read-Only Memory (ROM), a Programmable ROM (PROM), an Erasable PROM (EPROM), an Electrically EPROM (EEPROM) or a flash memory. The volatile memory may be a Random Access Memory (RAM) that serves as an external cache. By exemplary rather than limiting way, many forms of RAMs may be used, for example, a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It should be noted that the memories in the systems and methods described herein are intended to include, but not limited to, these and any other suitable types of memories.

It should be understood that the above memory is exemplary but not restrictive. For example, the memory in the embodiments of the present disclosure may also be static RAM (SRAM), dynamic RAM (DRAM), Synchronous DRAM (SDRAM), double data rate SDRAM (DDR SDRAM), enhanced SDRAM (ESDRAM), synch link DRAM (SLDRAM) and Direct Rambus RAM (DR RAM), etc. That is to say, the memory in the embodiments of the present disclosure is intended to include but not limited to these and any other suitable types of memory.

The embodiments of the present disclosure also provide a computer readable storage medium for storing a computer program.

Optionally, the computer readable storage medium may be applied to the network device in the embodiments of the present disclosure, and the computer program enables the computer to execute the corresponding process implemented by the network device in each method of the embodiments of the present disclosure. For brevity, details are not described herein again.

Optionally, the computer readable storage medium may be applied to the mobile terminal/terminal device in the embodiments of the present disclosure, and the computer program enables the computer to execute the corresponding process implemented by the mobile terminal/terminal device in each method of the embodiments of the present disclosure. For brevity, details are not described herein again.

A computer program product is further provided in an embodiment of the present disclosure. The computer program product includes computer program instructions.

Optionally, the computer program product may be applied to the network device in the embodiments of the present disclosure, and the computer program instructions enable the computer to execute the corresponding process implemented by the network device in each method of the embodiments of the present disclosure. For brevity, details are not described herein again.

Optionally, the computer program product may be applied to the mobile terminal/terminal device in the embodiments of the present disclosure, and the computer program instructions enable the computer to execute the corresponding process implemented by the mobile terminal/terminal device in each method of the embodiments of the present disclosure. For brevity, details are not described herein again.

A computer program is further provided in an embodiment of the present disclosure.

Optionally, the computer program may be applied to the network device in the embodiments of the present disclosure. When the computer program is run on a computer, the computer executes the corresponding process implemented by the network device in each method of the embodiments of the present disclosure. For brevity, details are not described herein again.

Optionally, the computer program may be applied to the mobile terminal/terminal device in the embodiments of the present disclosure. When the computer program is run on a computer, the computer executes the corresponding process implemented by the network device in each method of the embodiments of the present disclosure. For brevity, details are not described herein again.

Those of ordinary skill in the art may recognize that various exemplary units and algorithm steps described in the embodiments disclosed herein may be realized in electronic hardware, or a combination of computer software and electronic hardware. Whether these functions are performed in hardware or software depends on specific applications and design constraints of the technical solution. Skilled artisans may use different methods to implement the described functions for each particular application, but such implementation should not be considered to be beyond the scope of the present disclosure.

Those skilled in the art may clearly understand that for convenience and conciseness of description, the specific working processes of the system, device and unit described above may refer to the corresponding processes in the aforementioned method embodiments and will not be elaborated here.

In several embodiments provided by the present disclosure, it should be understood that the disclosed systems, devices and methods may be implemented in other ways. For example, the apparatus embodiments described above are only illustrative, for example, the division of the units is only a logical function division, and there may be other division manners in actual implementation, for example, multiple units or components may be combined or integrated into another system, or some features may be ignored or not executed. On the other hand, the mutual coupling or direct coupling or communication connection shown or discussed may be indirect coupling or communication connection through some interface, apparatus or unit, and may be in electrical, mechanical or other forms.

The unit described as a separate component may or may not be physically separated, and the components shown as a unit may or may not be a physical unit, i.e., they may be located in one place or may be distributed over multiple network units. Some or all of the units may be selected according to actual needs to achieve the purpose of solutions of the embodiments of the present disclosure.

In addition, various functional units in various embodiments of the present disclosure may be integrated in one processing unit, or the various units may be physically present separately, or two or more units may be integrated in one unit.

The functions may be stored in a computer readable memory medium if realized in a form of software functional units and sold or used as a separate product. Based on this understanding, the technical solution of the present disclosure, in essence, or the part contributing to the prior art, or the part of the technical solution, may be embodied in the form of a software product stored in a storage medium, including a number of instructions for causing a computer device (which may be a personal computer, a server, or a network device and the like) to perform all or part of the steps of the method described in various embodiments of the present disclosure. The aforementioned storage medium includes U disk, mobile hard disk, read-only memory (ROM), random access memory (RAM), magnetic disk or optical disk, and other medium capable of storing program codes.

The above is merely specific implementation of the present disclosure, but the protection scope of the present disclosure is not limited thereto. Any variation or substitution that may be easily conceived by a person skilled in the art within the technical scope disclosed by the present disclosure shall be included within the protection scope of the present disclosure. Therefore, the protection scope of the present disclosure shall be determined by the protection scope of the claims.

What is claimed is:

1. A method for wireless communication, comprising:
    reporting, by a first terminal device, capability information of the first terminal device and capability information of a third terminal device to a network device;
    acquiring, by the first terminal device, a first transmission resource set that is configured by the network device based on the capability information of the first terminal device and the capability information of the third terminal device, wherein resources in first transmission resource set are used for performing sidelink communication; and
    performing, by the first terminal device, the sidelink communication with the third terminal device using a resource in the first transmission resource set,
    wherein the capability information of the first terminal device is used for representing a bandwidth range supported by the first terminal device, and the capability information of the third terminal device is used for representing a bandwidth range supported by the third terminal device,
    wherein the method further comprises:
    receiving, by the first terminal device, the capability information of the third terminal device from the third terminal device through a fourth sidelink channel,
    wherein the first transmission resource set belongs to an intersection between a transmission resource set acquired according to the capability information of the first terminal device and a transmission resource set acquired according to the capability information of the third terminal device.

2. The method according to claim 1, wherein the fourth sidelink channel comprises a physical sidelink shared channel (PSSCH).

3. The method according to claim 1, wherein the first terminal device reports the capability information of the first terminal device and the capability information of the third terminal device using radio resource control (RRC) signaling.

4. The method according to claim 1, wherein the acquiring, by the first terminal device, the first transmission resource set configured by the network device for performing sidelink communication comprises:
    receiving, by the first terminal device, RRC signaling or a downlink control channel sent by the network device; and
    determining, by the first terminal device, the first transmission resource set based on the received RRC signaling or downlink control channel.

5. The method according to claim 1, wherein the first transmission resource set is located within a bandwidth range supported by the first terminal device.

6. A method for wireless communication, comprising:
    acquiring, by a network device, capability information of a first terminal device and capability information of a third terminal device from the first terminal device, wherein the first terminal device receives the capability information of the third terminal device from the third terminal device through a fourth sidelink channel; and
    sending, by the network device, first information to the first terminal device based on the capability information of the first terminal device and the capability information of the third terminal device, the first information indicating a first transmission resource set for the first terminal device to perform sidelink communication, wherein the capability information of the first terminal device is used for representing a bandwidth range supported by the first terminal device, and the capability information of the third terminal device is used for representing a bandwidth range supported by the third terminal device, wherein the first transmission resource set belongs to an intersection between a transmission resource set acquired according to the capability information of the first terminal device and a transmission resource set acquired according to the capability information of the third terminal device.

7. The method according to claim 6, wherein the acquiring the capability information of the first terminal device and the capability information of the third terminal device, comprises:

acquiring, by the network device, the capability information of the first terminal device and the capability information of the third terminal device from radio resource control (RRC) signaling sent by the first terminal device.

8. The method according to claim 6, wherein the network device sends the first information to the first terminal device through RRC signaling or a downlink control channel.

9. The method according to claim 6, wherein the first transmission resource set is located within a bandwidth range supported by the first terminal device.

10. A terminal device, wherein the terminal device is a first terminal device, comprising:

a processor;
a memory; and
a transceiver,
wherein the memory is used to store a computer program, and the processor is used to call and run the computer program stored in the memory to:
report capability information of the first terminal device and capability information of a third terminal device to a network device via the transceiver;
acquire a first transmission resource set configured by the network device for performing sidelink communication via the transceiver; and
perform the sidelink communication with the third terminal device using a resource in the first transmission resource set,
wherein the capability information of the first terminal device is used for representing a bandwidth range supported by the first terminal device, and the capability information of the third terminal device is used for representing a bandwidth range supported by the third terminal device,
wherein the processor is further configured to:
receive the capability information of the third terminal device from the third terminal device through a fourth sidelink channel via the transceiver,
wherein the first transmission resource set belongs to an intersection between a transmission resource set acquired according to the capability information of the first terminal device and a transmission resource set acquired according to the capability information of the third terminal device.

11. The terminal device according to claim 10, wherein the fourth sidelink channel comprises a physical sidelink shared channel (PSSCH).

12. The terminal device according to claim 10, wherein the processor is further configured to report the capability information of the first terminal device and the capability information of the third terminal device via the transceiver using radio resource control (RRC) signaling.

13. The terminal device according to claim 10, wherein the processor is further configured to receive, via the transceiver, RRC signaling or a downlink control channel sent by the network device, and determine the first transmission resource set based on the received RRC signaling or downlink control channel.

14. The terminal device according to claim 10, wherein the first transmission resource set is located within a bandwidth range supported by the first terminal device.

15. A network device, comprising:

a processor;
a memory; and
a transceiver,
wherein the memory is used to store a computer program, and the processor is used to call and run the computer program stored in the memory to:
acquire capability information of a first terminal device and capability information of a third terminal device from the first terminal device via the transceiver, wherein the first terminal device receives the capability information of the third terminal device from the third terminal device through a fourth sidelink channel; and
send first information to the first terminal device based on the capability information of the first terminal device and the capability information of the third terminal device via the transceiver, the first information indicating a first transmission resource set for the first terminal device to perform sidelink communication,
wherein the capability information of the first terminal device is used for representing a bandwidth range supported by the first terminal device, and the capability information of the third terminal device is used for representing a bandwidth range supported by the third terminal device,
wherein the first transmission resource set belongs to an intersection between a transmission resource set acquired according to the capability information of the first terminal device and a transmission resource set acquired according to the capability information of the third terminal device.

16. The network device according to claim 15, wherein the processor is further configured to:

acquire the capability information of the first terminal device and the capability information of the third terminal device via the transceiver from radio resource control (RRC) signaling sent by the first terminal device.

17. The network device according to claim 15, wherein the processor is further configured to send the first information to the first terminal device through RRC signaling or a downlink control channel via the transceiver.

18. The network device according to claim 15, wherein the first transmission resource set is located within a bandwidth range supported by the first terminal device.

* * * * *